(12) United States Patent
Hirata et al.

(10) Patent No.: US 10,185,060 B2
(45) Date of Patent: Jan. 22, 2019

(54) FREE-FORM SURFACE LENS, METHOD OF DESIGNING FREE-FORM SURFACE LENS, FREE-FORM SURFACE MIRROR, METHOD OF DESIGNING FREE-FORM SURFACE MIRROR, AND PROJECTION TYPE VIDEO DISPLAY APPARATUS

(71) Applicant: MAXELL, LTD., Kyoto (JP)

(72) Inventors: Koji Hirata, Osaka (JP); Masahiko Yatsu, Osaka (JP); Yuki Matsumiya, Osaka (JP); Shuji Kato, Osaka (JP); Kayono Kimura, Osaka (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/314,561

(22) PCT Filed: May 29, 2014

(86) PCT No.: PCT/JP2014/064256
§ 371 (c)(1),
(2) Date: Nov. 29, 2016

(87) PCT Pub. No.: WO2015/181926
PCT Pub. Date: Dec. 3, 2015

(65) Prior Publication Data
US 2017/0199308 A1    Jul. 13, 2017

(51) Int. Cl.
*G02B 3/02* (2006.01)
*G02B 3/04* (2006.01)
(Continued)

(52) U.S. Cl.
CPC ............. *G02B 3/04* (2013.01); *G02B 3/02* (2013.01); *G02B 5/10* (2013.01); *G02B 13/16* (2013.01);
(Continued)

(58) Field of Classification Search
CPC ... G02B 3/04; G02B 3/02; G02B 5/10; G02B 5/08; G02B 17/08; G02B 27/0012; G02B 27/00; G03B 21/28
(Continued)

(56) References Cited

U.S. PATENT DOCUMENTS 6,992,718 B1 *  1/2006  Takahara ............... G02B 23/14
                                                    348/333.09
8,403,503 B1 *  3/2013  Geng .................... G03B 21/28
                                                    353/119
(Continued)

FOREIGN PATENT DOCUMENTS

CN         1891425 A      1/2007
CN       101135737 A      3/2008
(Continued)

OTHER PUBLICATIONS

Chinese Office Action dated Nov. 16, 2017 for the Chinese Application No. 201480079279.5.

*Primary Examiner* — William R Alexander
(74) *Attorney, Agent, or Firm* — Volpe and Koenig, P.C.

(57) ABSTRACT

A free-form surface lens is made of a transparent resin forming an oblique projection optical system including a free-form surface mirror in a projection type video display apparatus, this lens includes a lens effective region having a surface on which a predetermined free-form surface is formed, and an edge surface formed to surround the lens effective region, the lens effective region and the edge surface in a part of a circumference surrounding the lens effective region where the edge surface is not formed are joined to each other by at least either one of a curved surface and a flat surface set so as not to change a direction of a tilt of the lens effective region in vicinity of the lens effective
(Continued)

region, and an end surface including at least either one of the curved surface and the flat surface is set as a tapered surface.

6 Claims, 7 Drawing Sheets

(51) Int. Cl.
| | |
|---|---|
| G02B 17/08 | (2006.01) |
| G02B 5/10 | (2006.01) |
| G02B 27/00 | (2006.01) |
| G02B 21/28 | (2006.01) |
| G02B 13/16 | (2006.01) |
| G02B 7/182 | (2006.01) |

(52) U.S. Cl.
CPC ............ *G02B 17/08* (2013.01); *G02B 21/28* (2013.01); *G02B 27/0012* (2013.01); *G02B 7/182* (2013.01)

(58) Field of Classification Search
USPC .......................................................... 359/708
See application file for complete search history.

(56) References Cited

U.S. PATENT DOCUMENTS

| | | | | |
|---|---|---|---|---|
| 9,482,866 | B2* | 11/2016 | Arai | G02B 27/0025 |
| 2003/0063389 | A1* | 4/2003 | Koyama | G02B 27/1026 |
| | | | | 359/618 |
| 2006/0098450 | A1* | 5/2006 | Iwasaki | F21S 48/1159 |
| | | | | 362/545 |
| 2006/0139718 | A1* | 6/2006 | Ishihara | G02B 26/101 |
| | | | | 359/205.1 |
| 2007/0009629 | A1 | 1/2007 | Okumura et al. | |
| 2008/0055736 | A1 | 3/2008 | Tsuji et al. | |
| 2009/0108477 | A1* | 4/2009 | Yamakaji | C03B 23/0258 |
| | | | | 264/1.21 |
| 2009/0289380 | A1* | 11/2009 | Chisha | C03B 23/0258 |
| | | | | 264/1.1 |
| 2010/0026971 | A1* | 2/2010 | Okura | G03B 21/10 |
| | | | | 353/99 |
| 2010/0097582 | A1 | 4/2010 | Nagase et al. | |
| 2010/0171937 | A1* | 7/2010 | Hirata | G02B 13/16 |
| | | | | 353/70 |
| 2010/0195061 | A1 | 8/2010 | Takaura et al. | |
| 2012/0081676 | A1 | 4/2012 | Hirata et al. | |
| 2012/0320347 | A1* | 12/2012 | Morikuni | G02B 13/12 |
| | | | | 353/101 |
| 2012/0327372 | A1* | 12/2012 | Otani | G02B 13/08 |
| | | | | 353/31 |
| 2013/0050658 | A1* | 2/2013 | Morohoshi | G03B 21/145 |
| | | | | 353/57 |
| 2013/0308106 | A1 | 11/2013 | Takaura et al. | |
| 2014/0029287 | A1* | 1/2014 | Anzai | F21S 48/1154 |
| | | | | 362/521 |
| 2014/0117397 | A1* | 5/2014 | Saeki | B29D 11/0048 |
| | | | | 257/98 |
| 2015/0290854 | A1* | 10/2015 | Nakamura | B29C 45/37 |
| | | | | 428/141 |

FOREIGN PATENT DOCUMENTS

| | | |
|---|---|---|
| CN | 202306108 U | 7/2012 |
| JP | 2007-021739 A | 2/2007 |
| JP | 2007-024930 A | 2/2007 |
| JP | 2007-041538 A | 2/2007 |
| JP | 2008-250296 A | 10/2008 |
| JP | 2009-086315 A | 4/2009 |
| JP | 2010-269957 A | 12/2010 |
| JP | 2012-098713 A | 5/2012 |

* cited by examiner

FREE-FORM SURFACE LENS, METHOD OF DESIGNING FREE-FORM SURFACE LENS, FREE-FORM SURFACE MIRROR, METHOD OF DESIGNING FREE-FORM SURFACE MIRROR, AND PROJECTION TYPE VIDEO DISPLAY APPARATUS

TECHNICAL FIELD

The present invention relates to an optical element having a lens surface and a mirror surface to which a free-form surface is applied, a method of designing the optical element, and a projection type video display apparatus using the optical elements. The present invention also relates to a free-form surface lens and free-form surface mirror effectively applied to a projection type video display apparatus, the free-form surface lens and free-form surface mirror having a lens surface and a reflecting mirror surface to which a free-form surface formed by plastic injection molding is applied.

BACKGROUND ART

In recent years, a projection type video display apparatus which can project a favorable large projection image even at a short distance has been widely used. In order to achieve the projection of the favorable large projection image, application of so-called oblique projection optical system is already known in a projection optical system of such a projection type video display apparatus, the oblique projection optical system using a free-form surface lens in combination with a concave mirror having an eccentric aspherical shape.

For example, Patent Document 1 discloses a projection optical apparatus which includes a projection lens constituted by a first optical system including a transmission type refractive element and a second optical system including a reflection type refractive element, and in which some lenses of the first optical system is housed in a lower space whose lower limit is at a lower end of the second optical system.

In addition, Patent Document 2 discloses a projection type video display apparatus which can project a favorable large projection image even at a short distance by using a combination of a lens system and a concave mirror.

RELATED ART DOCUMENTS

Patent Documents

Patent Document 1: Japanese Patent Application Laid-Open Publication No. 2009-86315
Patent Document 2: Japanese Patent Application Laid-Open Publication No. 2008-250296

SUMMARY OF THE INVENTION

Problems to be Solved by the Invention

The above-described conventional techniques teach that the favorable large projection image can be projected by using combination of a lens system and a concave mirror in a projection optical system of a projection type video display apparatus. However, in the conventional techniques, it is assumed that a plastic lens having a shape of symmetry with respect to an optical axis of the lens is used as a lens constituting the lens system, and there is no description about problems caused in forming the plastic lens and means for solving the problems.

An object of the present invention is to provide an excellent free-form surface lens and free-form surface mirror, a method of designing them, and a projection type video display apparatus using them by solving problems caused in forming a free-form surface lens used in combination with a convex mirror as different from a plastic lens having a shape of symmetry with respect to an optical axis of the lens.

Means for Solving the Problems

In order to achieve the above-described object, a typical aspect of the present invention has a feature having the following constitution in a free-form surface lens, a free-form surface mirror, a method of designing a free-form surface lens, a method of designing a free-form surface mirror, and a projection type video display apparatus.

A free-form surface lens according to an embodiment is a free-form surface lens made of a transparent resin forming an oblique projection optical system including a free-form surface mirror in a projection type video display apparatus, the free-form surface lens has: a lens effective region having a surface on which a predetermined free-form surface is formed; and an edge surface formed to surround the lens effective region, the lens effective region and the edge surface in a part of a circumference surrounding the lens effective region where the edge surface is not formed are joined to each other by at least either one of a curved surface and a flat surface set so as not to change a direction of a tilt of a lens effective region in vicinity of the lens effective region, and an end surface including at least either one of the curved surface and the flat surface is set as a tapered surface.

A method of designing a free-form surface lens according to an embodiment is a method of designing a free-form surface lens made of a transparent resin forming an oblique projection optical system including a free-form surface mirror in a projection type video display apparatus, a lens effective region having a surface on which a predetermined free-form surface is formed is set, and an edge surface formed to surround the lens effective region is set, the lens effective region and the edge surface in a part of a circumference surrounding the lens effective region where the edge surface is not formed are joined to each other by at least either one of a curved surface and a flat surface so as not to change a direction of a tilt of a lens effective region in vicinity of the lens effective region, and an end surface including at least either one of the curved surface and the flat surface is set as a tapered surface.

A free-form surface lens according to an embodiment is a free-form surface lens made of a transparent resin forming an oblique projection optical system including a free-form surface mirror in a projection type video display apparatus, the free-form surface lens has: a lens effective region having a surface on which a predetermined free-form surface is formed; and an edge surface formed to surround the lens effective region, and a surface roughness of the edge surface is larger than a surface roughness of the lens effective region.

A free-form surface mirror according to an embodiment is a free-form surface mirror made of a transparent resin forming an oblique projection optical system including a free-form surface mirror in a projection type video display apparatus, the free-form surface mirror has: a lens effective region having a surface on which a predetermined free-form surface is formed; and a lens region (referred to as a free-form surface region sometimes hereinafter) obtained by extending a free-form surface shape formed so as to surround the lens effective region as it is. The reflecting mirror surface may be a convex surface with respect to a video projection surface and may have a rear surface as an opposing surface of the reflecting surface having almost the same shape as that of the reflecting surface so as to provide a uniform thickness in order to improve the formability of the mirror. A surface roughness of the rear surface may be 20 times smaller than a surface roughness of the lens effective region. As a result, the rear surface (the mold surface is a convex surface) is adhesive in forming the mirror, so that balance in adhesion between the reflecting surface and the rear surface (the adhesion of the molded component to the mold surface) at the time of mold releasing is improved, and a free-form surface shape accuracy of the mirror surface is consequently improved. In order to improve the above-described adhesion balance, the surface roughness of the rear surface is made to be 10 times smaller than the surface roughness of the lens effective region, so that a further improving effect is obtained, and therefore, a free-form surface mirror with excellent shape accuracy in a free-form surface effective region is provided.

A method of designing a free-form surface mirror according to an embodiment is a method of designing a free-form surface mirror made of a transparent resin forming an oblique projection optical system including a free-form surface mirror in a projection type video display apparatus, a lens effective region having a surface on which a predetermined free-form surface is formed is set, and an edge surface formed to surround the lens effective region is set, and a surface roughness of the edge surface is set to be larger than a surface roughness of the lens effective region.

A projection type video display apparatus according to an embodiment is a projection type video display apparatus which enlarges and projects video light obtained by modulating light from a light source by using an optical modulation unit, the projection type video display apparatus has an oblique projection optical system which enlarges and projects the modulated video light, the oblique projection optical system partially includes a free-form surface lens, and the free-form surface lens includes the above-described free-form surface lens or free-form surface mirror.

Effects of the Invention

According to an embodiment of the present invention, problems caused in forming a free-form surface mirror or a free-form surface lens used in combination with the free-form surface mirror can be solved, and a free-form surface lens and free-form surface mirror which have excellent formability, a method of designing them, and a projection type video display apparatus constituted by using them can be provided.

BEST MODE FOR CARRYING OUT THE INVENTION

Hereinafter, embodiments of the present invention will be described in detail with reference to the accompanying drawings. The embodiments of the present invention include a free-form surface lens, a free-form surface mirror, design methods including methods of forming them, and a projection type video display apparatus constituted by using them.

Figure 1:
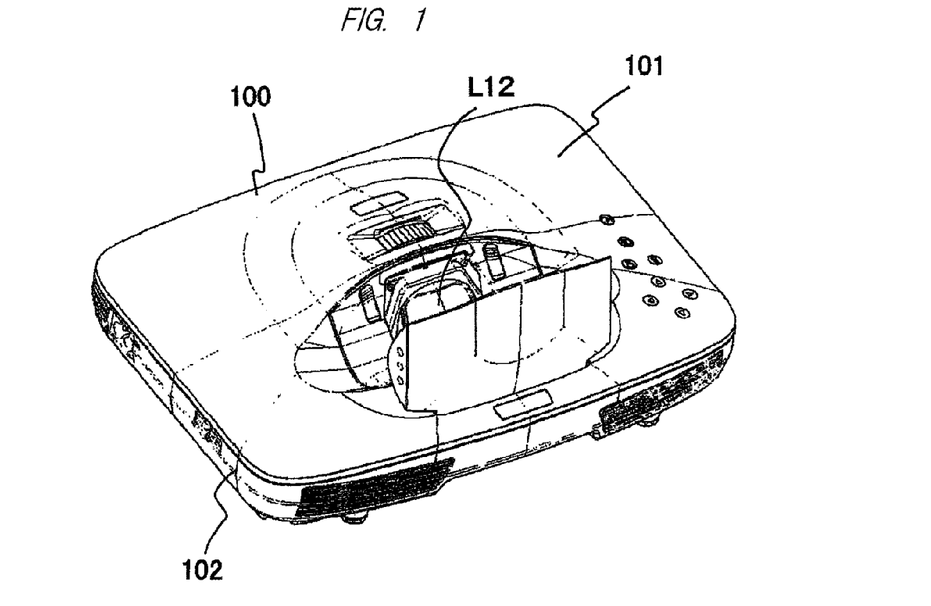
FIG. 1 is a perspective view showing an overall outer appearance of a projection type video display apparatus according to an embodiment of the present invention.

First, FIG. 1 is a perspective view showing an overall outer appearance of a projection type video display apparatus according to an embodiment which uses a free-form surface lens according to the embodiment of the present invention in combination with a concave mirror. In FIG. 1, a reference numeral 100 denotes a projection type video display apparatus, a reference numeral 101 denotes an upper surface cover of the projection type video display apparatus 100, and a reference numeral 102 denotes a lower surface cover. As clearly seen from FIG. 1, a window portion 103 which is opened when the projection type video display apparatus 100 is used is attached to a part of the upper surface cover 101 so as to be detachable. Note that FIG. 1 shows a state in which the window portion 103 is open. A free-form surface lens constituting a projection optical system described below is denoted by a reference character L12.

Although not shown in FIG. 1, components constituting the projection type video display apparatus 100 are mounted in the internal space formed by the upper surface cover 101 and the lower surface cover 102. The components are, for example, a lamp as a light source, an optical modulation unit, an oblique projection optical system including a free-form surface lens and a free-form surface mirror, various circuit components including a power supply circuit and a control circuit, a cooling fan, and others.

The optical modulation unit is an optical modulation unit which modulates light from the light source into video light based on an external video signal or others, and is, for example, a video display element such as a DLP (Digital Light Processing) and a liquid crystal panel. The oblique projection optical system includes a so-called free-form surface lens and free-form surface mirror which can project the video light on a wall surface while reducing trapezoidal distortion or others even at an extremely close distance (from a large oblique angle), resulting in an excellent projected video image. The various circuit components include a power supply circuit and control circuit which supply necessary power and control signals to the above-described components. The cooling fan guides heat generated in the components to the outside of the apparatus.

Figure 2:
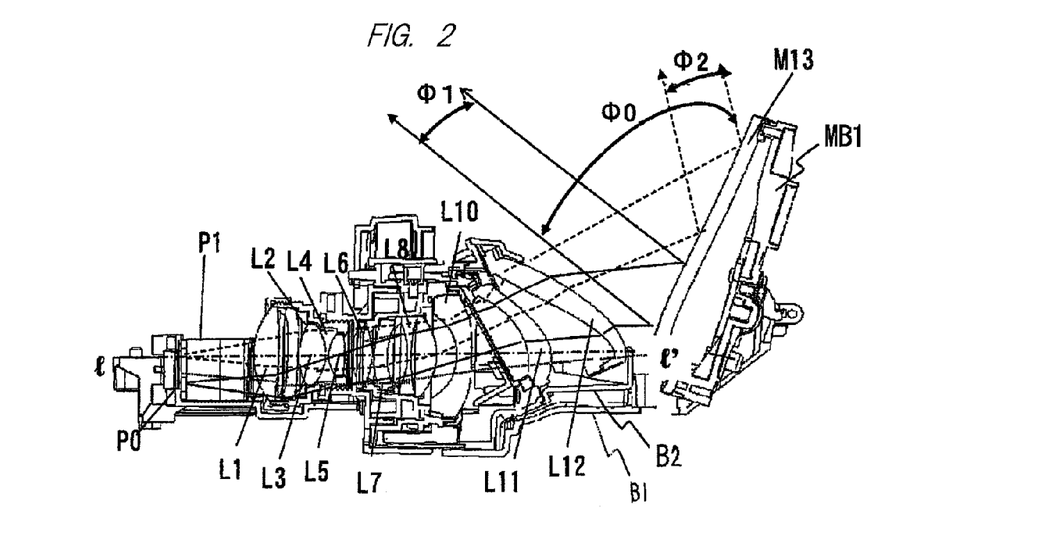
FIG. 2 is a lens arrangement diagram explaining an operation principle of a projection lens in an oblique projection optical system according to an embodiment.

Next, FIG. 2 shows a lens arrangement to explain an operation principle of a projection lens in the oblique projection optical system. The oblique projection optical system of FIG. 2 is constituted by 12 lenses denoted by reference characters L1 to L12 and one mirror denoted by a reference character M13. Here, in each of the reflecting surface of the mirror M13 and the lens surfaces of the lenses L11 and L12, a free-form surface shape is formed. The lenses L11 and L12 are so-called free-form surface lenses. Therefore, even in an oblique projection optical system which projects a video image at a very large oblique angle, a projected video image with reduced trapezoidal distortion can be obtained. That is, according to this manner, a degree of freedom in design is as large as about five times that of an aspherical shape, and therefore, aberration can be favorably corrected.

The oblique projection optical system also includes a light source placed on an opposing surface of a prism optical element denoted by a reference character P0 in FIG. 2. This light source is a semiconductor light source in this case, although not shown. The light from the light source is totally reflected by the prism surface, enters a video display element denoted by a reference character P1, is converted into a video light flux by the video display element P1, is transmitted through the prism surface, and enters the projection lens. The video display element P1 is a reflection type video display element.

A video light flux (the overall video light flux is denoted by a reference character $\varphi 0$) from the video display element P1 passes through different places of the respective lenses in the projection lens with respect to an image formation position on a projection surface. The free-form surface mirror M13 and the free-form surface lenses L11 and L12 are located to be upper than an optical axis shared by most of other lenses. Therefore, an unnecessary lens effective region can be eliminated to achieve downsizing. Therefore, the overall cost of the apparatus can be reduced.

In addition, when a lens denoted by a reference character L10 in FIG. 2 has a lens surface as an aspherical lens, the lens corrects comatic aberration and spherical aberration. That is, the lens L10 is an aspherical lens. Furthermore, the lens L10 is placed at a position which the light flux obliquely-passes through, and therefore, a higher-order comatic aberration caused by the oblique entering of the light flux into the lens is corrected by forming the lens surface into an aspherical shape.

Following the lens L10 as this aspherical lens, free-form surface plastic lenses denoted by reference characters L11 and L12 which are free-form surface lenses and a free-form surface plastic mirror denoted by reference character M13 which is a free-form surface mirror are attached as a part of the projection lens forming the above-described oblique projection optical system.

For the convenience for the explanation here, FIG. 2 shows through which portion of each lens a light flux $\varphi 2$ and a light flux $\varphi 1$ pass, the light flux $\varphi 2$ forming an image on an upper end portion of the projection surface and the light flux $\varphi 1$ forming an image on an almost central portion of the projection surface pass, each lens being denoted by each of the reference characters L1 to L12 which constitute the projection lens. The upper limit light of the light flux $\varphi 2$ forming the image on the upper end portion of the projection surface and the lower limit light of the light flux $\varphi 1$ forming the image on almost the central portion of the projection surface do not overlap each other at the aspherical lens L10 and the free-form surface lenses L11 and L12. Therefore, the aberration can be independently corrected, so that the correction ability can be significantly improved.

This tendency further significantly appears at the free-form surface mirror M13. The lenses L1 to L10 which contribute to the aberration correction in a region relatively close to the optical axis are housed in a lens barrel B1, and the lenses L1 and L12 which contribute to the aberration correction in a region spaced apart from the optical axis are housed in a lens barrel B2 differently formed from the lens barrel B1 for focus adjustment. In this manner, distances among the lens L10, the lens L11 and the lens L12, and the free-form surface mirror M13 can be adjusted, and besides, a distance between the lens L11 and the lens L12 can be adjusted.

Meanwhile, the free-form surface mirror M13 is attached to a mirror base MB1, and is structured to be opened/closed by, for example, an electric motor not shown. In addition, by fixation of all these components to a projection lens base with high accuracy, a predetermined focusing ability can be obtained.

Figure 3:
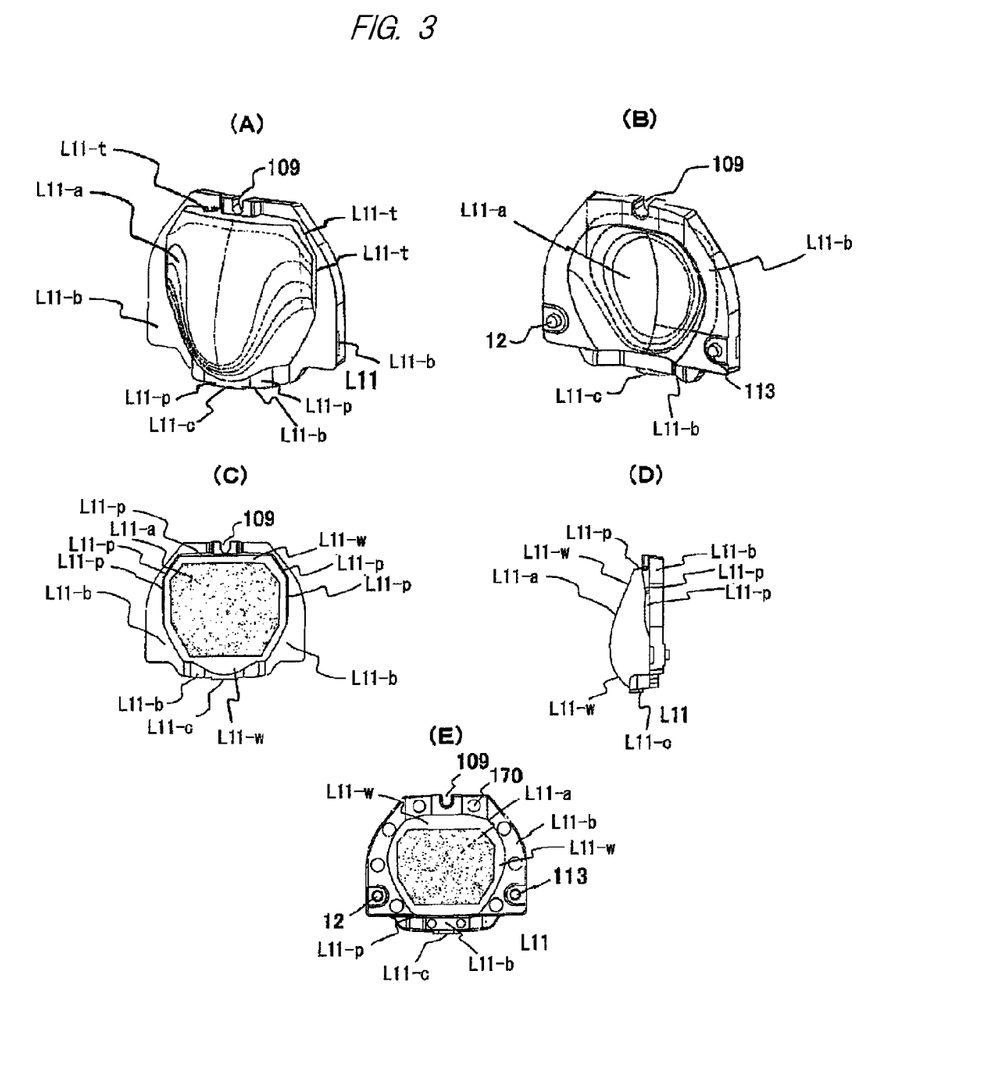
FIG. 3 is a diagram showing an outer shape of a free-form surface lens (L11) according to an embodiment so as to include a perspective view viewed from a front side, a perspective viewed from a back side, a front view, a side view, and a back view.

FIG. 3 shows the outer shape of the free-form surface lens L11 described above. A diagram (A) of FIG. 3 shows a perspective view of the free-form surface lens L11 viewed from the front side, a diagram (B) shows a perspective view of the same viewed from the back side, a diagram (C) shows a front view of the same, a diagram (D) shows a side view of the same, and a diagram (E) shows a back view of the same. The free-form surface lens L11 is a lens made of plastic, and is provided with not only a lens effective region L11-$a$ but also a so-called lens edge portion (to be also referred to as edge portion) L11-$b$, as clearly seen from FIG. 3. The lens edge portion L11-$b$ is provided on the outer circumferential portion of the lens effective region L11-$a$ for the purpose of positioning and holding the lens when it is housed in the lens barrel B2. The reference character L11-$b$ particularly indicates a surface of an edge portion.

Particularly in the views (A) and (B) in FIG. 3, in the lens effective region L11-$a$ of the free-form surface lens L11, a contour line for indicating the surface shape of the region is shown by a broken line. In addition, a reference character L11-$c$ in FIG. 3 denotes a gate portion in injection of a resin.

Figure 4:
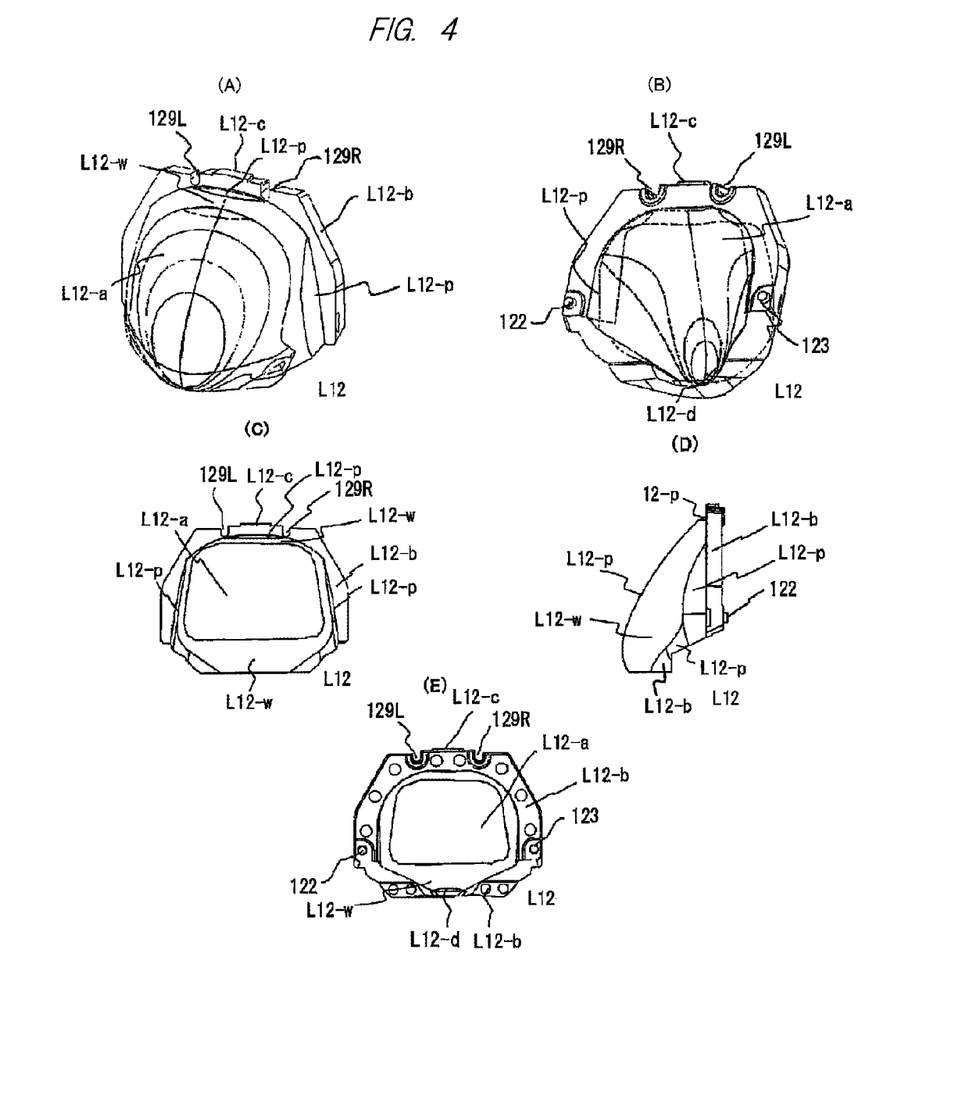
FIG. 4 is a diagram showing an outer shape of a free-form surface lens (L12) according to an embodiment so as to include a perspective view viewed from a front side, a perspective viewed from a back side, a front view, a side view, and a back view.

FIG. 4 shows an outer shape of the free-form surface lens L12 described above as similar to FIG. 3. A diagram (A) of FIG. 4 shows a perspective view of the free-form surface lens L12 viewed from the front side, a diagram (B) shows a perspective view of the same viewed from the back side, a diagram (C) shows a front view of the same, a diagram (D) shows a side view of the same, and a diagram (E) shows a back view of the same. The free-form surface lens L12 is also a lens made of plastic as similar to L11 described above, and is provided with not only a lens effective region L12-$a$ but also a so-called lens edge portion L12-$b$, as clearly seen from FIG. 4. The lens edge portion L12-$b$ is provided on the outer circumferential portion of the lens effective region L12-$a$ for the purpose of positioning and holding the lens when it is housed in the lens barrel B2.

Particularly in the views (A) and (B) in FIG. 4, in the lens effective region L12-$a$ of the free-form surface lens L12, a contour line for indicating the surface shape of the region is shown by a broken line. In addition, a reference character L12-$c$ in FIG. 4 denotes a gate portion in injection of a resin.

Figure 5:
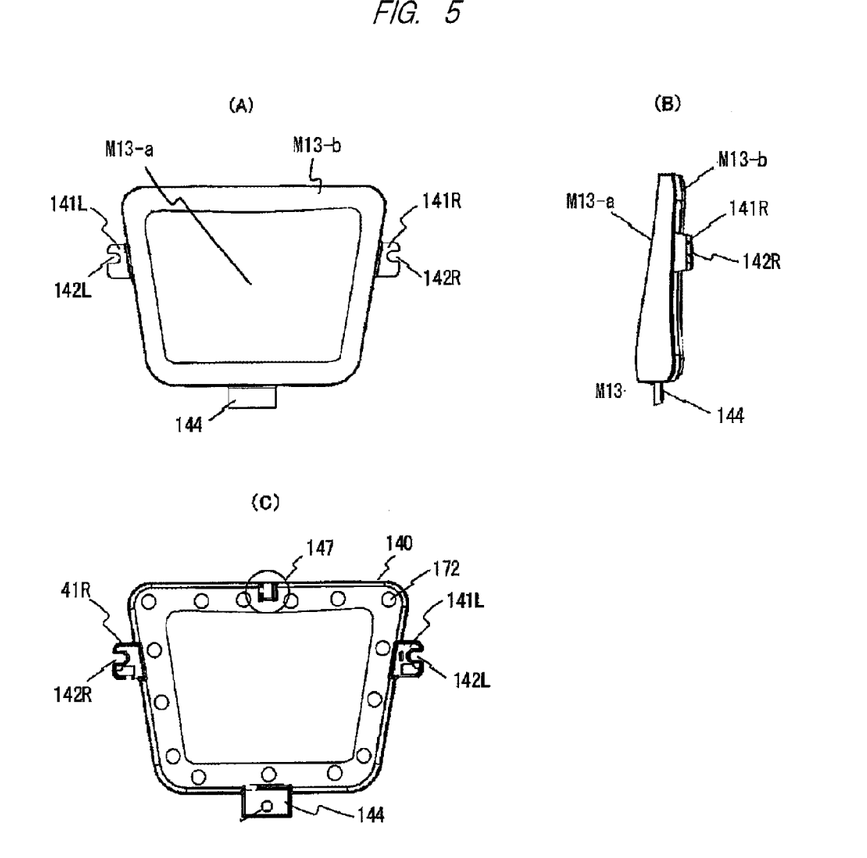
FIG. 5 is a diagram showing an outer shape of a free-form surface mirror (M13) according to an embodiment so as to include a front view, a side view, and a back view.

In addition, FIG. 5 shows an outer shape of the free-form surface mirror M13 described above. A diagram (A) of FIG. 5 shows a front view of the free-form surface mirror M13, a diagram (B) shows a side view of the same, and a diagram (C) shows a back view of the same. The free-form surface mirror M13 is made of plastic as similar to the above description. This free-form surface mirror M13 is provided with not only a mirror effective region M13-*a* but also a free-form region which is a lens region in which the free-form shape extends as it is in an outer circumferential portion of the mirror effective region M13-*a*, as clearly seen from FIG. 5.

The reflecting mirror surface is a convex surface with respect to a video projection surface and may be designed to have a uniform mirror thickness in order to improve the formability of the mirror and obtain mass production stability. More specifically, in a design method according to the present embodiment, a mirror with a uniform thickness can be obtained by forming a shape of the rear surface of the mirror surface as the reflecting surface to be almost the same shape as that of the reflecting surface. Meanwhile, in view of workability, the rear surface shape may be a curved plane or substantially flat plane having an average curvature coinciding with that of the reflecting surface.

Meanwhile, a surface roughness of the rear surface may be 20 times smaller than a surface roughness of the lens effective region. As a result, the rear surface (the mold surface is a convex surface) is adhesive in forming the mirror, so that balance in adhesion between the reflecting surface and the rear surface (the adhesion of the molded component to the mold surface) at the time of mold releasing is improved, and a free-form surface shape accuracy of the mirror surface is consequently improved. In order to improve the above-described adhesion balance, the surface roughness of the rear surface is made to be 10 times smaller than the surface roughness of the lens effective region, so that a further improving effect is obtained, and therefore, a free-form surface mirror with excellent shape accuracy in a free-form surface effective region is provided.

In addition, so-called fixing portions 141 and 144 are provided to portions except for the free-form surface region of the free-form surface mirror are provided for the purpose of the positioning and holding in the attachment to the mirror base MB1. The fixing portion 141 is denoted by reference characters 141L and 141R.

The above-described free-form surface lenses L11 and L12 and the above-described free-form surface mirror M13 are formed by the following design method including a method of molding them. That is, according this design method, a mold for injection molding is manufactured, and a shape of the mold is repeatedly corrected a plurality of times so that a shape of the molded lens surface has the minimum error with respect to a designed shape in consideration of the shrinkage, warpage, and others of the plastic. The above-described lenses and mirror are formed by injection molding using the mold having the shape obtained by this correction as described above.

Generally, in the injection molding, a pellet- or powder-form transparent resin is thermally melted in a screw, the thermal molten resin is extruded from gate portions (L11-*c*, L12-*c*, and M13-*c*) into a cavity formed by a movable piece and a fixed piece through a sprue and a runner of the mold while being pressurized by the rotation of the screw, so that the resin is filled in the mold.

Here, note that a finding obtained by the present inventors in manufacturing the free-form surface lenses L11 and L12 by using molds for the injection molding will be described below.

As described above, in the free-form surface lens at the time of optical design, the aberration of the lens shape in the effective region through which an effective light flux passes is corrected on a light incident surface which the effective light flux as a light flux contributing to the image formation enters and a light emitting surface from which a light flux subjected to a lens effect emits as a degree of freedom in the design.

Meanwhile, in order to accurately hold and fix the free-form surface lens in the lens barrel, a lens edge surface, i.e., a surface for fixing the lens to the lens barrel, is set together with the above-described lens effective region, and they are joined to each other, so that a final shape of the lens is determined.

However, a lens surface of a free-form surface lens having a complicated shape often has a shape asymmetric with respect to the optical axis, and therefore, it is difficult to provide the above-described edge surface over the entire lens surface.

When it is difficult to provide the above-described edge surface over the entire lens surface, note that a mold release resistance which is particularly caused by the mold releasing in the formation of the lens inside the mold followed by the mold releasing of the lens from the mold is not uniformed, and this ununiformity becomes a cause for lens deformation.

Accordingly, solution means provided by the present inventors for solving the above-described problem will be described below.

Figure 8:
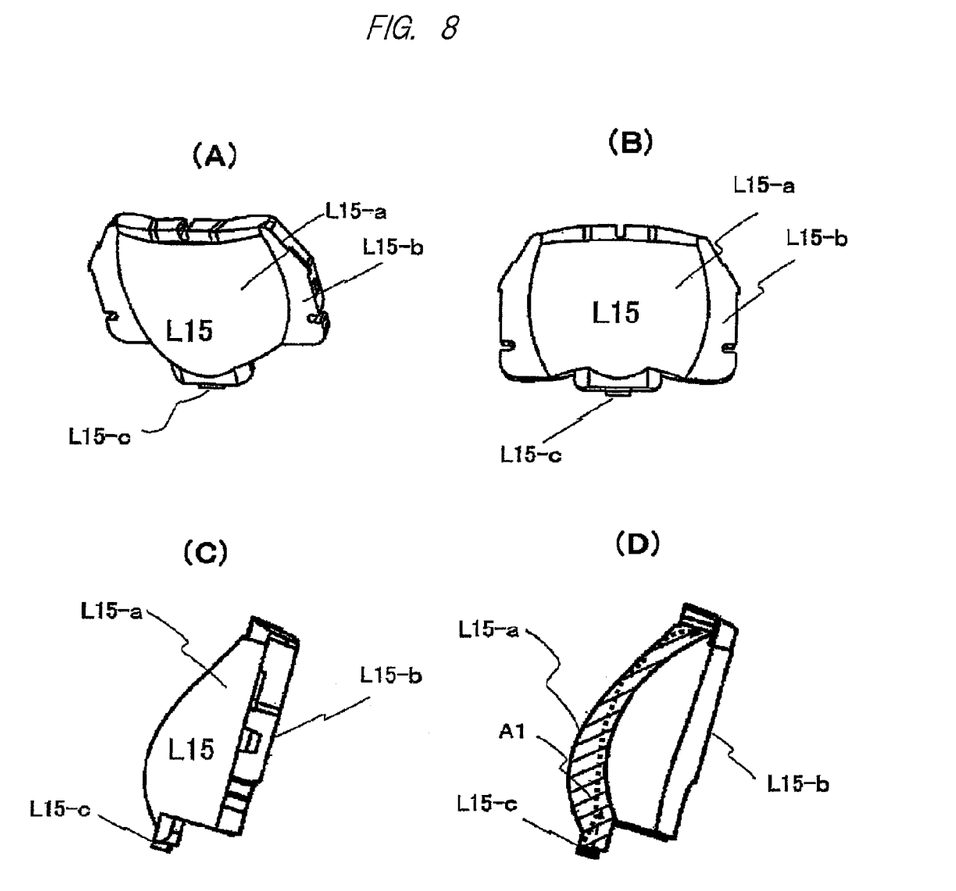
FIG. 8 is a diagram showing a shape of a conventional first free-form surface lens for comparison with the embodiment so as to include a perspective view, a plan view, a side view, and a side cross-sectional view.
Figure 9:
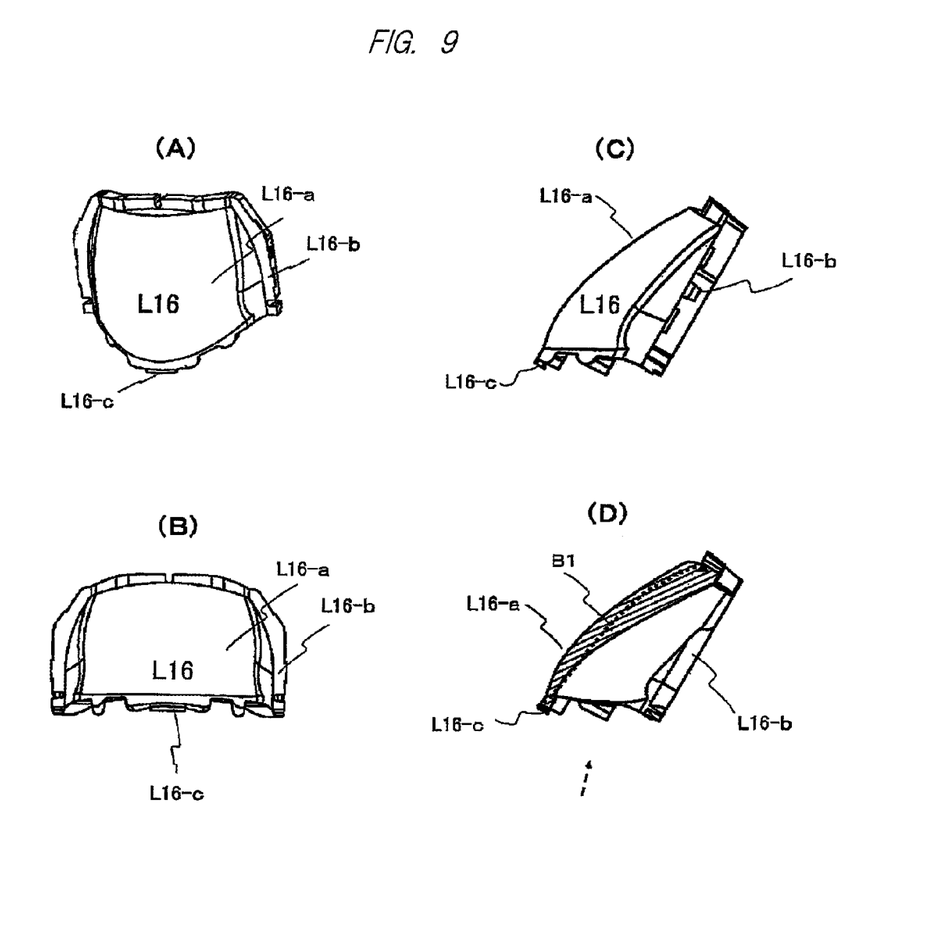
FIG. 9 is a diagram showing a shape of a conventional second free-form surface lens for comparison with the embodiment so as to include a perspective view, a plan view, a side view, and a side cross-sectional view.

First, a method of designing a free-form surface lens as a conventional technique will be described below with reference to FIGS. 8 and 9. FIG. 8 shows a shape of a conventional first free-form surface lens for comparison with the present embodiment. FIG. 9 shows a shape of a conventional second free-form surface lens for comparison with the present embodiment.

First, a free-form surface lens L15 shown in (A) to (D) of FIG. 8 as a more specific example is a lens corresponding to the free-form surface lens L12 shown in FIG. 3. A diagram (A) of FIG. 8 is a perspective view of L15, a diagram (B) of the same is a plan view, a diagram (C) of the same is a side view, and a diagram (D) of the same is a side cross-sectional view. A free-form surface lens L16 shown in (A) to (D) of FIG. 9 is a lens corresponding to the free-form surface lens L11 shown in FIG. 4. A diagram (A) of FIG. 9 is a perspective view of L16, a diagram (B) of the same is a plan view, a diagram (C) of the same is a side view, and a diagram (D) of the same is a side cross-sectional view.

As clearly seen from FIG. 8, a lens edge portion L15-*b* used to position and hold the lens in housing is provided in an outer circumferential portion of a lens effective region L15-*a*. Similarly, a lens edge portion L16-*b* used to position and hold the lens in housing is provided in an outer circumferential portion of a lens effective region L16-*a*.

However, these free-form surface lenses have portions without the edge portions L15-*b* and 16-*b* in a part of the lenses, i.e., each lower end part of the lens effective regions L15-*a* and L16-*a* shown in (A) to (D) of FIG. 8 and (A) to (D) of FIG. 9 because of the complicated lens shapes.

In such portions without the edge portion, mold release resistances which are caused by the mold releasing in the formation of the lens inside the mold followed by the mold releasing of the lens from the mold are not uniformed, and this ununiformity becomes a cause for lens deformation.

In the design method according to the present embodiment, when a lens surface has a concave surface shape and it is impossible to provide the edge surface over the entire circumference of the lens surface as described above, the edge surface L11-*b* is continuously formed on the outer circumferential portion of the lens effective region by joining the lens effective region to the edge surface through flat and curved surfaces (straight and curved lines) so as not to change the tilt direction of the plane of the lens effective region (i.e., not to change a sign of a differential value).

Furthermore, it has been found that it is effective to provide a tapered portion for removal from the mold in the outer circumferential portion. In this case, particularly when the maximum distance of the flat and curved surfaces (straight and curved lines of an end portion of it) is equal to or more than 1/20 of a length of a long side of the lens, it has been found that it is effective to provide a tapered surface with a taper angle of 5° or more up to 20° at the maximum in an end surface of it. If the taper angle exceeds 20°, note that it is difficult to continuously form the lens effective region and the edge portion.

Figure 6:
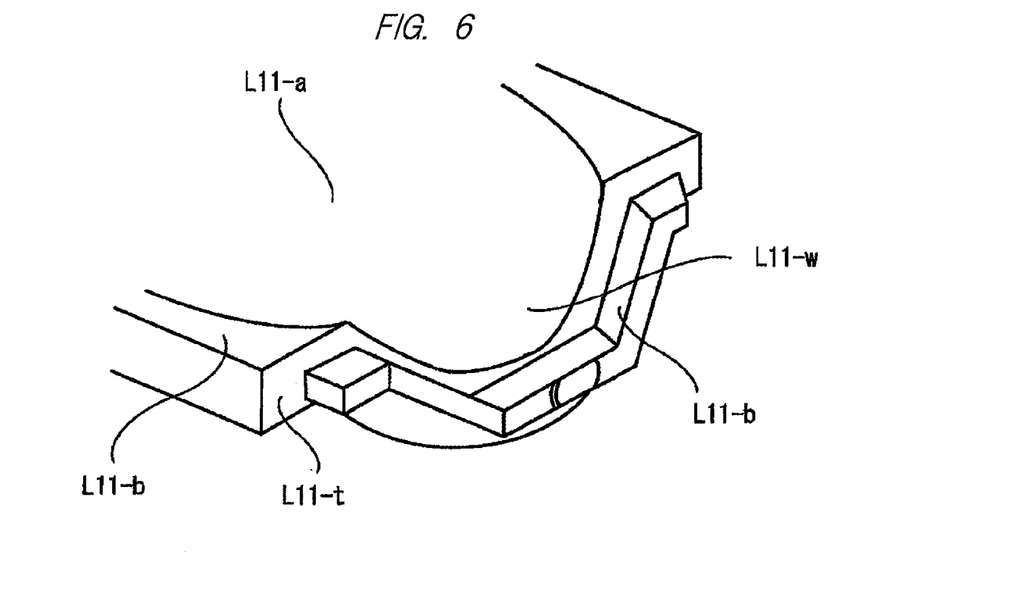
FIG. 6 is an explanatory diagram for explaining a constitution of the free-form surface lens (L11) according to an embodiment and a method of designing the lens.

For example, in the above-described free-form surface lens L11, as shown in FIG. 3 and also FIG. 6, a curved surface L11-$w$ and a flat surface L11-$p$ described above are formed in the outer circumferential portion of the lens effective region L11-$a$ (indicated by a mesh region in (C) and (E) of FIG. 3), so that the lens effective region and the lens edge portion L11-$b$ are joined to each other. A reference numeral 109 in FIG. 3 denotes a concave portion formed in the lens edge portion L11-$b$ to position and hold the lens in the lens housing, and reference numerals 112 and 113 denote protruding portions formed for the positioning and holding.

As clearly seen from (C) of FIG. 3 and FIG. 6, in a lower portion of the lens, the edge surfaces L11-$b$ on both sides of the lens effective region L11-$a$ are joined to each other by forming the above-described curved surface L11-$w$ or flat surface L11-$p$. Note that the curved surface L11-$w$ is set so as not to change the tilt direction of the lens effective region L11-$a$ (i.e., a sign of a differential value) in vicinity of the curved surface as described above. In this case, since the lens effective region L11-$a$ in the vicinity of it is the concave surface, the curved surface L11-$w$ is set to has a curved line which protrudes downward. The flat surface L11-$p$ of the end portions of the curved surface L11-$w$ formed as described above is the tapered surface described above.

In the method of designing a free-form surface lens according to the present embodiment as described above, an end portion of the lens effective region L11-$a$ is continuously formed between the edge surfaces L11-$b$ on both sides of the lens effective region L11-$a$. As a result, the joining between the edge surfaces L11-$b$ is reinforced, and the mold release resistances caused by the mold releasing are uniformed in the lens surface, so that the completed free-form surface lens can be stably removed so as not to be deformed from the mold without lens deformation.

FIG. 6 is an explanatory view for explaining a method of designing the free-form surface lens L11 and shows states of the lens effective region L11-$a$ and the edge surfaces L11-$b$ of the free-form surface lens L11 in FIG. 3 so that they are enlarged.

In addition, for example, in a portion without the edge portion L12-$b$ in a part of the above-described free-form surface lens L12 (lower part of the drawing), as shown in FIG. 4 and also FIG. 6, a curved surface L12-$w$ and a flat surface L12-$p$ are formed in the outer circumferential portion of the lens effective region L12-$a$, so that the lens effective region and the lens edge portion L12-$b$ are joined to each other.

Furthermore, in the lower portion of the lens, by the formation of the above-described curved surface L12-$w$ and flat surface L12-$p$, the lens edge portions L12-$b$ on both sides of the lens effective region L12-$a$ are joined to each other. Note that the curved surface L12-$w$ is also set so as not to change the tilt direction of the lens effective region 12-$a$ (i.e., a sign of a differential value) in the vicinity of the curved surface L12-W as described above. The flat surface L12-$p$ of the end portion of the curved surface L12-$w$ has a tapered surface as described above.

In this case, note that a dam-shaped convex portion L12-$d$ is further formed between the curved lens edge portions L12-$b$, and has a side surface having a tapered surface as similar to the above description. Also here, reference numerals 129L and 129R in FIG. 4 denote respective concave portions formed in the lens edge portions L12-$b$ used to position and hold the lens in the lens housing, and reference numerals 122 and 123 denote protruding portions which are also used for the positioning and the holding.

By such a shape of the free-form surface lens of the embodiment as described above, the joining between the lens edge portions L12-$b$ is further reinforced also because of the function of the dam-shaped convex portion L12-$d$, and the mold release resistances caused by the mold releasing are uniformed in the lens surface, so that the completed free-form surface lens can be stably removed from the mold without lens deformation, more specifically, without the spreading of the lens L12 having a U-shaped cross-sectional surface toward both sides.

Figure 7:
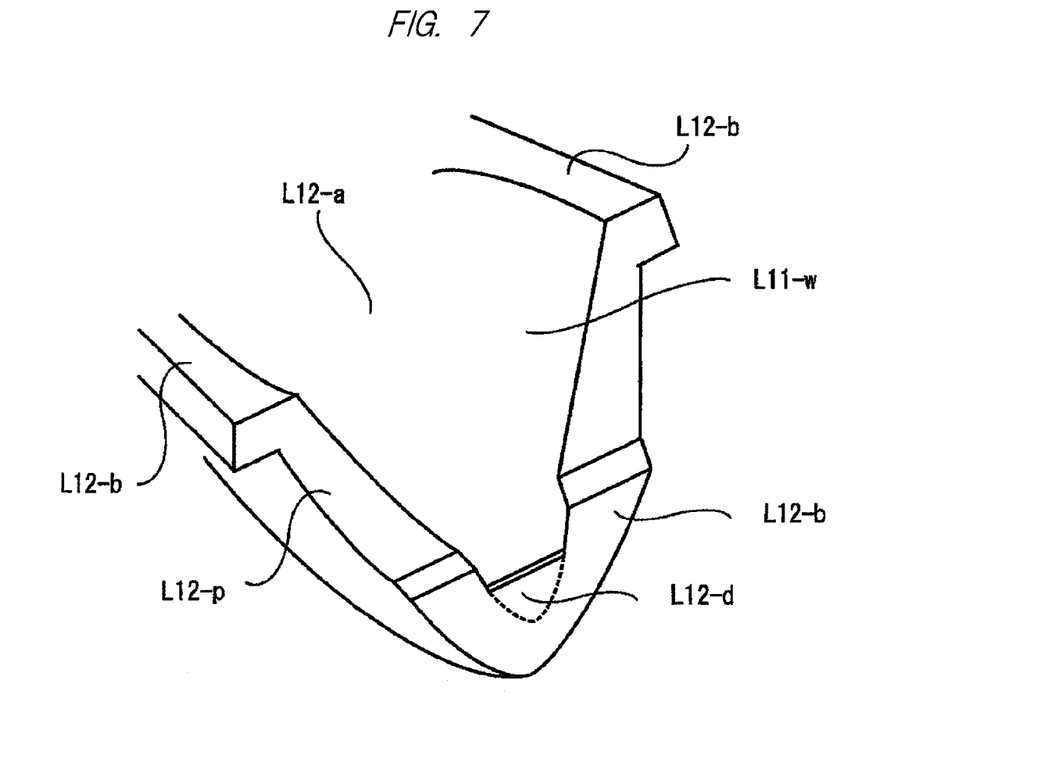
FIG. 7 is an explanatory diagram for explaining a constitution of the free-form surface lens (L12) according to an embodiment and a method of designing the lens.

FIG. 7 is an explanatory diagram for explaining a method of designing the free-form surface lens L12, and shows states of the lens effective region L12-$a$ and lens edge portion L12-$b$ of the free-form surface lens L12 in FIG. 4 so that they are enlarged.

Next, as a problem, particularly when the shape of the lens surface is molded, such free-form surface lenses L11 and L12 as including the lens effective regions L11-$a$ and L12-$a$ and the lens edge portions L11-$b$ and L12-$b$, and besides, the above-described tapered surfaces, are adhered to the mold by the shrinkage of the lenses caused by a temperature difference between a resin forming the lenses and the mold. This problem also becomes a cause for deformation of the lens when the completed free-form surface lens is removed from the mold. Particularly on a lens surface, an adverse effect caused by such a phenomenon is large because its surface is to be mirrored.

Accordingly, as a result of study on the above-described problem, it has been found that it is effective as a countermeasure to reduce the above-described adhesion to the mold by increasing the surface roughness of the free-form surface lenses L11 and L12, particularly the lens edge portions L11-$b$ and L12-$b$. Note that a preferable surface roughness is, for example, about 20 nm, or equal to or more than 20 nm and equal to or less than 100 nm.

In addition, the phenomenon as described above has been observed in not only the free-form surface lenses L11 and L12 but also the free-form surface mirror M13 as a plastic mirror molded by a synthetic resin.

Accordingly, application of the above-described method of designing the lens to the free-form surface mirror M13 as a plastic mirror has been proposed. More specifically, in the free-form surface mirror and the method of designing of the free-form surface mirror according to the present embodiment, the outer circumferential portion of the mirror effective region M13-$a$ as a reflecting surface of the free-form surface mirror M13 shown in diagrams (A) to (C) in FIG. 5 is provided with a free-form surface region which is a lens region where the free-form surface shape extends as it is.

This reflecting mirror surface is a convex surface with respect to a video projection surface so as to be designed to have a uniform mirror thickness in order to improve the formability of the mirror and obtain mass production stability. More specifically, a mirror with a uniform thickness is obtained by forming the rear surface of the mirror surface as the reflecting surface so as to have almost the same shape as that of the reflecting surface. In addition, a reflecting-mirror protruding pin is formed in a range of the rear surface except for the free-form surface effective surface of the reflecting mirror to stabilize a molding accuracy within the free-form surface effective surface of the reflecting mirror at the time of mold releasing.

Furthermore, a balance of the reflecting surface and the rear surface in the adhesion at the time of mold releasing (in other words, the adhesion of the molded component to the mold surface) is taken by forming the surface roughness of the rear surface to be about 20 times larger than the surface roughness of the lens effective region and gradually reducing the surface roughness so as to tightly adhere the rear surface to the mold (the mold surface is a convex surface) at the time of mirror molding. As a result, in order to improve the above-described balance of adhesion, the surface roughness of the rear surface is made to be smaller than 10 times the surface roughness of the lens effective region, so that a further improving effect can be obtained, and a free-form surface mirror with excellent shape accuracy in a free-form surface effective region is provided.

In the design method including the method of molding the free-form surface mirror M13 as the above-described plastic mirror, a completed free-form surface mirror can be safely removed from a mold as similar to the free-form surface lenses L11 and L12 described above. In addition, here, reference characters 141L and 141R denote protruding portions which are formed on both edges outside the free-form surface effective region to position and hold the free-form surface mirror M13 when it is attached to the mirror base MB1, reference characters 142L and 142R denote concave portions similarly provided in the protruding portions. A reference character 144 denotes a protruding portion formed on a lower edge outside the free-form surface effective region.

In the present embodiment, the free-form surface lenses L11 and L12 including the free-form surface mirror M13 as the above-described plastic mirror are used as free-form surface lenses and a free-form surface mirror constituting an oblique projection optical system of a projection type video display apparatus. According to the present embodiment, these lenses and mirrors can be mass-produced at a low cost from resins by using molds. In this manner, a free-form surface lens and free-form surface mirror which contributes to the cost reduction of the projection type video display apparatus and which have excellent performance can be obtained. In this manner, an excellent effect of providing an inexpensive projection type video display apparatus with excellent performance can be achieved.

In the foregoing, the embodiments of the present invention have been concretely described. However, the present invention is not limited to the foregoing embodiments and various modifications can be made. For example, the above-described embodiments have described the entire apparatus in detail in order to easily explain the present invention, are not always limited to the ones including all configurations. A part of the configuration of the embodiments can be eliminated, added to, and replaced with other configuration, or others.

EXPLANATION OF REFERENCE CHARACTERS

100 . . . projection type video display apparatus, L11 and L12 . . . free-form surface lens, L11-a and L12-a . . . lens effective region, L11-b and L12-b . . . lens edge portion, L11-c and L12-c . . . gate portion, L11-p and L12-p . . . flat surface, L11-w and L12-w . . . curved surface, L12-d . . . dam-shaped convex portion, M13 . . . free-form surface mirror, M13-a . . . mirror effective region, M13-b . . . edge portion

The invention claimed is:

1. A free-form surface lens made of a transparent resin forming an oblique projection optical system including a reflecting mirror with a convex surface with respect to a video projection surface in a projection type video display apparatus, comprising:
   a lens effective region having a surface on which a predetermined free-form surface is formed; and
   an edge surface formed to surround the lens effective region,
   wherein the lens effective region and the edge surface in a part of a circumference surrounding the lens effective region where the edge surface is not formed are joined to each other by at least either one of a curved surface and a flat surface set so as not to change a direction of a tilt of the lens effective region in vicinity of the lens effective region, and an end surface including at least either one of the curved surface and the flat surface is set as a tapered surface,
   wherein a shape of the reflecting mirror with the convex surface with respect to the video projection surface is a free-form surface shape,
   a reflecting mirror protruding pin is formed at a position outside an effective surface of a free-form surface of the reflecting mirror on a rear surface of a reflecting mirror formed surface, and
   a surface roughness of the edge surface is larger than a surface roughness of the lens effective region, and
   wherein, when a maximum distance of at least either one of a straight line and a curved line is equal to or larger than 1/20 of a long side of the lens, the tapered surface is a tapered surface having an angle of 5° or more and 20° or less.

2. The free-form surface lens according to claim 1, wherein a surface roughness of the edge surface is larger than a surface roughness of the lens effective region.

3. The free-form surface lens according to claim 1, wherein the surface roughness of the edge surface is 20 nm or more and 100 nm or less.

4. A method of designing a free-form surface lens made of a transparent resin forming an oblique projection optical system including a reflecting mirror with a convex surface with respect to a video projection surface in a projection type video display apparatus,
   a lens effective region having a surface on which a predetermined free-form surface is formed is set,
   an edge surface formed to surround the lens effective region is set, and
   the lens effective region and the edge surface in a part of a circumference surrounding the lens effective region where the edge surface is not formed are joined to each other by at least either one of a curved surface and a flat surface so as not to change a direction of a tilt of a lens effective region in vicinity of the lens effective region, and an end surface including at least either one of the curved surface and the flat surface is set as a tapered surface,
   wherein, when a maximum distance of at least either one of the a curved surface and the flat surface is equal to or more than ⅟₂₀ of a long side of the lens, the tapered surface is set as a tapered surface having an angle of 5° or more and 20° or less.

5. The method of designing the free-form surface lens according to claim 4,
wherein a surface roughness of the edge surface is set to be larger than a surface roughness of the lens effective region.

6. The method of designing the free-form surface lens according to claim 4,
wherein the surface roughness of the edge surface is set to be 20 nm or more and 100 nm or less.

\* \* \* \* \*